UNITED STATES PATENT OFFICE.

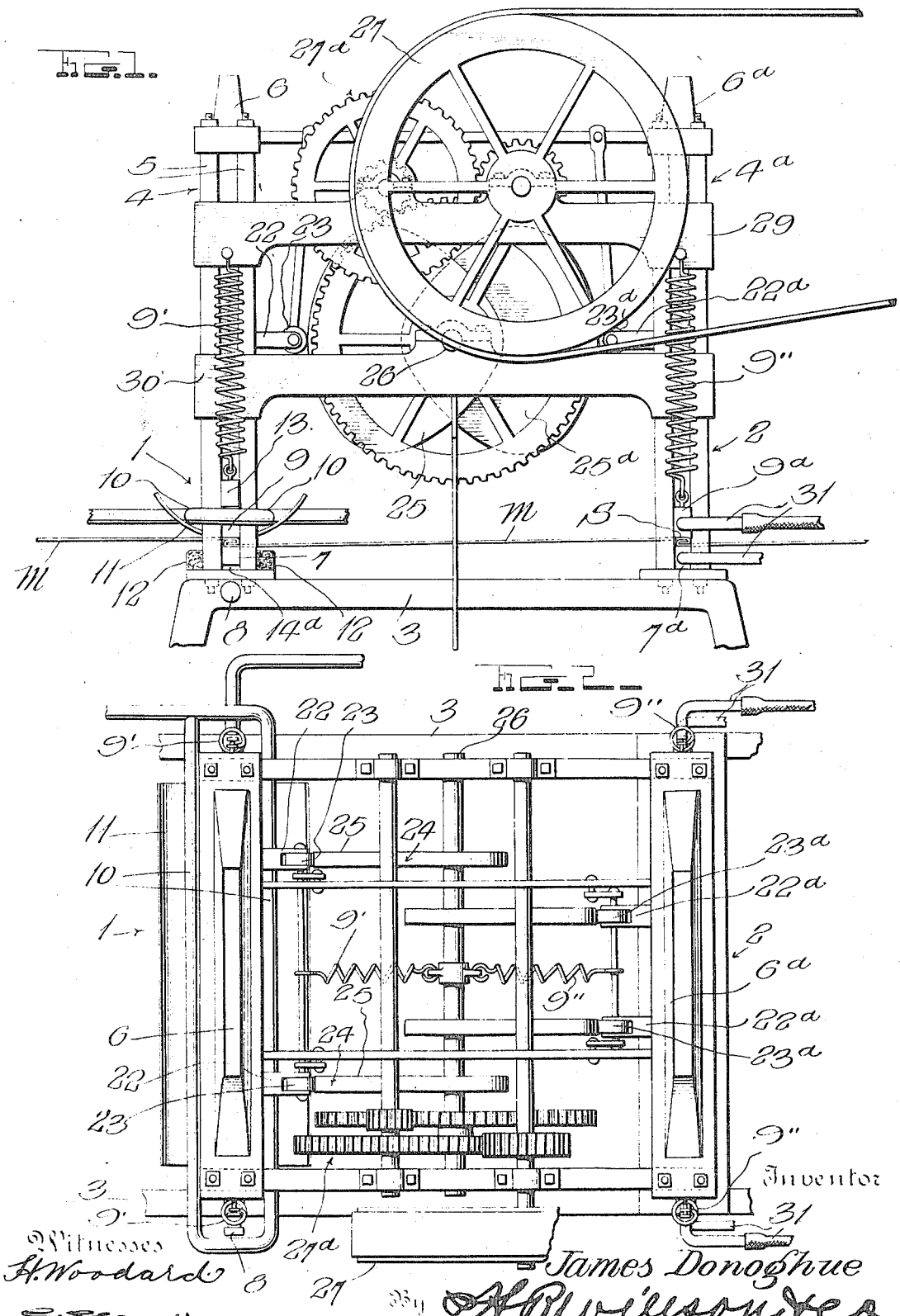

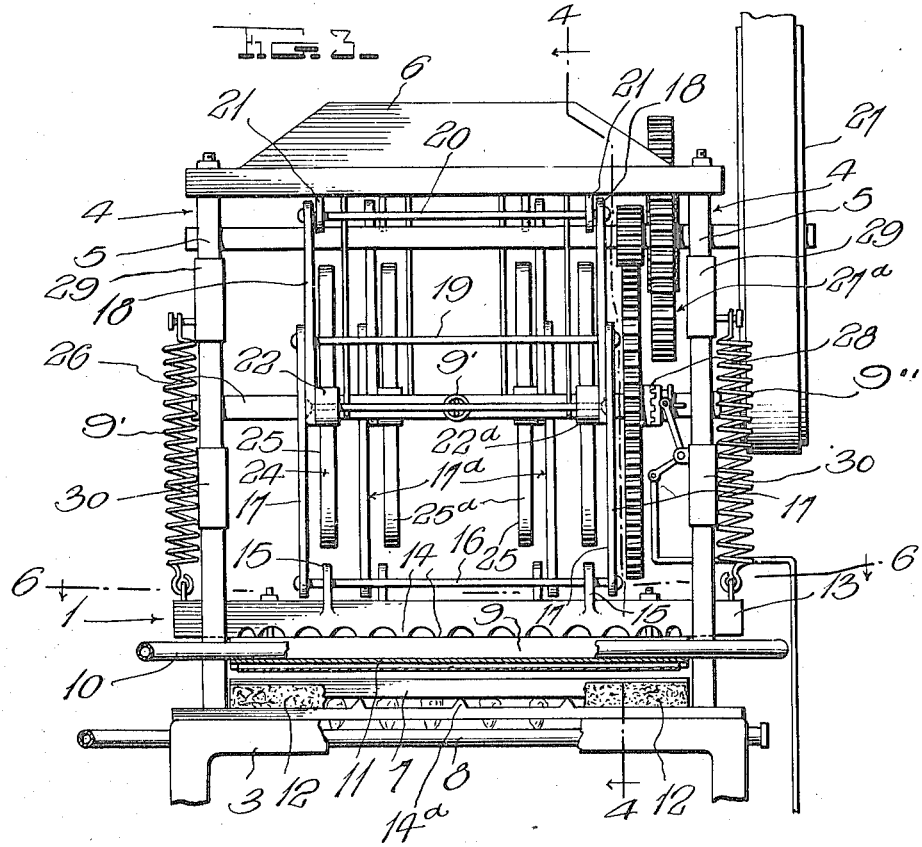
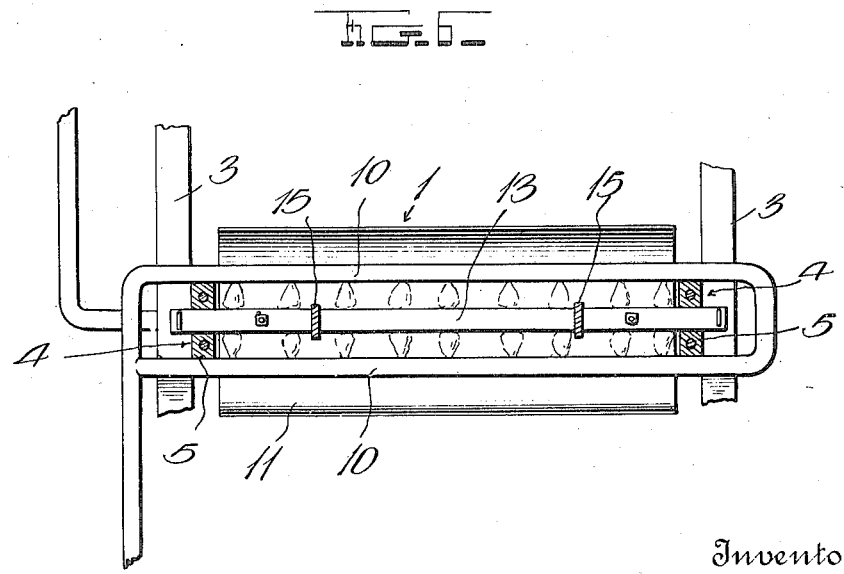

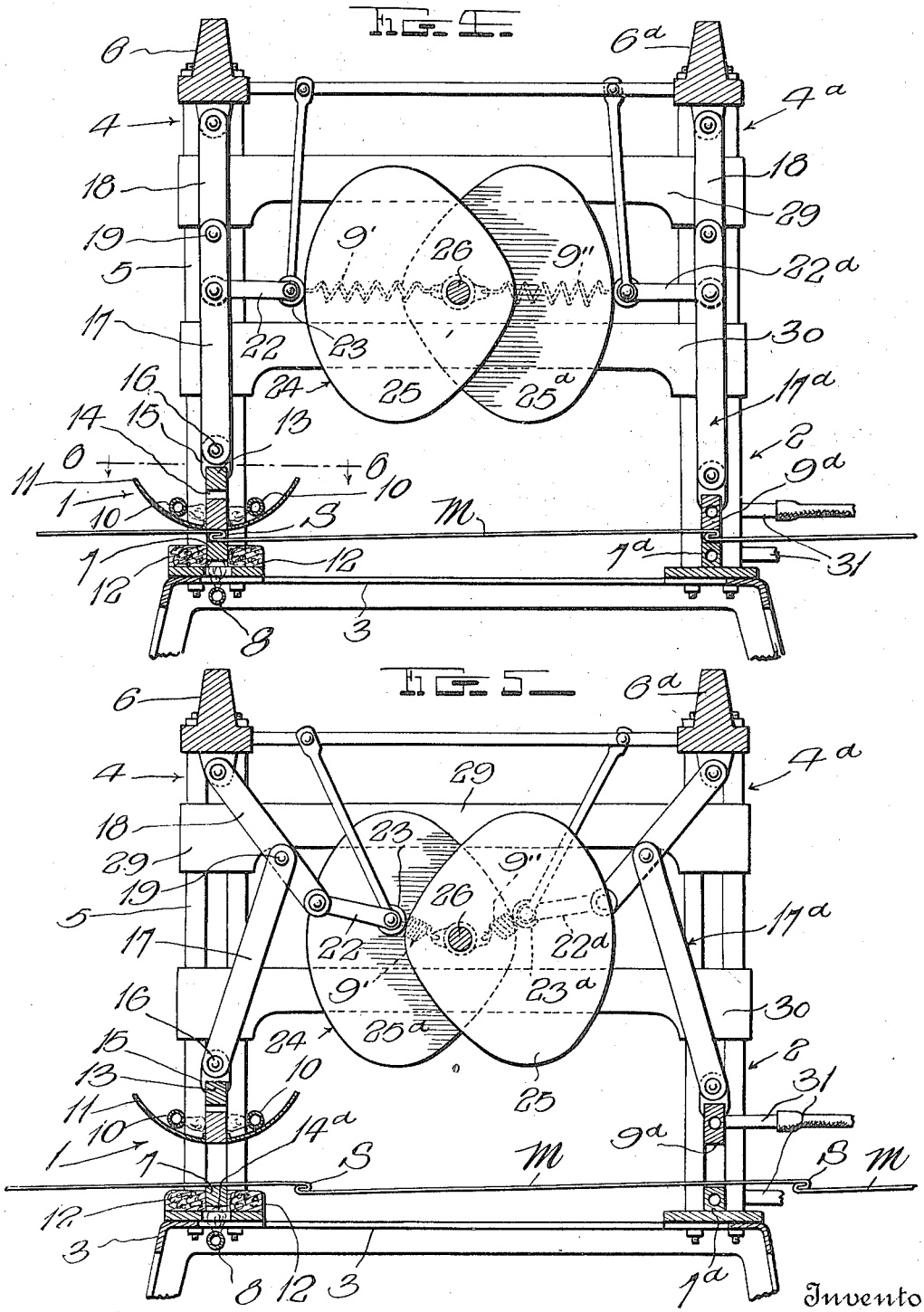

JAMES DONOGHUE, OF CLEVELAND, OHIO.

SOLDERING-PRESS.

1,197,920.

Specification of Letters Patent. Patented Sept. 12, 1916.

Application filed November 15, 1915. Serial No. 61,552.

*To all whom it may concern:*

Be it known that I, JAMES DONOGHUE, a citizen of the United States, residing at Cleveland, in the county of Cuyahoga and State of Ohio, have invented certain new and useful Improvements in Soldering-Presses; and I do declare the following to be a full, clear, and exact description of the invention, such as will enable others skilled in the art to which it appertains to make and use the same.

My invention relates to the class of machines designed for soldering the joints between sheets of metal after either placing solder and flux in such seams or after so heavily coating the sheets as to render further use of solder unnecessary. Heretofore, this has been accomplished by pressing the seams in a hot press to melt the solder and distribute the same evenly, but when making comparatively wide seams, the latter often spread apart or spring open to a noticeable extent before the solder cools and hardens.

It is therefore the primary intention of my invention to provide a seam forming machine having in addition to the usual hot press, a cold press in which the seams are held to cool the solder and at the same time prevent the seams from spreading open during the cooling operation.

Another object is to provide simple yet efficient and powerful means for projecting the movable jaws of the two presses from a single cam shaft, such means being so constructed as to reduce friction on the cams to a minimum.

With the foregoing objects in view, the invention resides in certain novel features of construction and in unique combinations of parts to be hereinafter fully described and claimed, the descriptive matter being supplemented by the accompanying drawings in which similar reference characters designate corresponding parts throughout the several views, and wherein:—

Figure 1 is a side elevation of a soldering press constructed in accordance with my invention; Fig. 2 is a top plan view thereof; Fig. 3 is a front elevation; Fig. 4 is a vertical section taken on the plane of the line 4—4 of Fig. 3 with the movable jaws of the hot and cold presses lowered; Fig. 5 is a similar view with the movable jaws of the two presses raised; and Fig. 6 is a detail horizontal sectional view taken on the plane of the lines 6—6 of Figs. 3 and 4.

In these drawings, the numerals 1 and 2 designate respectively the hot and cold press of the improved machine, the two being supported by a table 3 such as is commonly used in machines of the class to which the invention relates.

The press 1 includes a pair of spaced parallel upright guides 4, each being preferably formed of a pair of parallel bars 5, the upper ends of said guides being connected by a heavily reinforced crown bar 6, while interposed between their lower ends, is a fixed jaw 7 in the form of a horizontal bar heated at will by a gas burner 8. Disposed above the jaw 7 is a vertically movable jaw 9 whose opposite ends are disposed adjacent the guides 4. The jaw 9 is in turn heated by a pair of gas burners 10, shields 11 being preferably interposed between such burners and the table 3 to prevent excessive heating of the sheets of metal to be positioned upon the latter, while heating of such metal directly over the burner 8 is likewise prevented by the provision of appropriate insulation 12 preferably formed of asbestos.

The jaw 9 is rigidly secured to a horizontal bar 13 whose ends slide between the upright bars 5 of the guides 4, the lower side of said bar 13 being formed at intervals with ribs 14 to provide a restricted area for contact with the jaw 9, whereby to reduce the radiation of heat from such jaw to the bar, to a minimum. Likewise, the lower jaw 7 rests on a series of ribs 14ª on the bed plate of the press to obtain ample support with as little heat transferring area as possible. The bar 13 is formed on its upper side with ears or the like 15 connected by a rod 16 on which the lower ends of lower toggle links 17 are mounted, the upper ends of said links being pivoted to upper toggle links 18 by a rod 19 which passes through the intermediate portions of said links 18. The upper ends of the last named links are pivotally connected with the crown bar 6 by the passage of a bolt or the like 20 through said ends and through ears 21 depending from said bar, while the lower ends of said links 18 are pivoted to horizontally movable links 22 which extend toward the press 2 and carry anti-friction rollers 23.

The rollers 23 bear on the edges 24 of a pair of ovate cams 25 mounted on a shaft 26 disposed between the two presses and preferably driven from a fly wheel 27 through the instrumentality of an appropriate train of gears 27ª, when the clutch 28 is thrown in by the actuation of a suitable foot lever or the like, (not shown).

The press 2 comprises a pair of upright guides 4ª constructed in identically the same manner as the guides 4 and connected at their upper ends by a crown bar 6ª, the guides 4 and 4ª being in turn connected by upper and lower transverse bars 29 and 30 by which the bearings of the numerous shafts and gears are carried. Interposed between the lower ends of the guides 4ª is a rigid jaw 7ª, while positioned above said jaw and guided vertically by the aforesaid guides, is a movable jaw 9ª connected with a toggle link mechanism 17ª identical with that previously described and provided with operating links 22ª whose ends are equipped with anti-friction rollers or the like 23ª traveling on the edges of additional cams 25ª secured on the shaft 26. Each of the jaws 7ª and 9ª is of hollow formation and water circulating pipes 31 deliver into and lead from such jaws whereby to allow a circulation of cold water therein to retain them at the lowest temperature possible.

When operating the machine, the burners 8 and 10 are first lighted to raise the temperature of the jaws 7 and 9 to the necessary degree, after which the fly wheel 27 is started by any appropriate power. The sheets of metal M with their seams S interlocked are now moved upon the table until the first seam is disposed beneath the jaw 9, whereupon the clutch 28 is thrown in with the result that the cams 25 aline the toggle links 17 and 18 and force the aforesaid jaw 9 downwardly onto the seam. The heat from the jaws 7 and 9 will now melt the solder which has been previously placed in such seam, or the coating of the sheets, if it be heavy enough to serve as a binder. After the jaw 9 has been down a sufficient length of time for accomplishing this result, the cams 25 allow said jaw to rise. The two jaws 9 and 9ª operate in unison and are normally raised by springs or the like 9' and 9" respectively. The clutch is now thrown out to prevent further movement of the two jaws 9 and 9ª and the sheets M may then be moved along the table 3 to position the next seam beneath the jaw 9, thus simultaneously disposing the previously soldered seam under the jaw 9ª of the cold press. When the clutch is now again thrown in, the two movable jaws descend, the jaw 9 assisting in heating another seam, while the jaws 9ª and 7ª coact to clamp the previously soldered seam together while the solder is cooling, thus preventing such seam from spreading apart or springing open. The cycle of operation just described takes places successively as long as the machine is in operation and obviously produces better results than are obtainable with presses heretofore used.

In the drawings, certain specific details of construction have been shown for illustrative purposes, and in the preceding such details have been described, but obviously numerous changes may be made within the scope of the invention without sacrificing any of the advantages thereof.

I claim:

1. A machine for soldering seams between sheets of metal, comprising a hot press in which the seams are held and heated to melt the solder, and a cold press in which said seams are held to cool the solder and at the same time to prevent spreading of the seams during the cooling operation.

2. A machine for soldering seams between sheets of metal, comprising means for heating the seams to melt the solder, and a cold press for holding said seams to cool the solder and at the same time to prevent spreading of the seams during the cooling operation.

3. A machine for soldering seams between sheets of metal, comprising means for heating the seams, and a press spaced from the heating means and having a hollow jaw equipped with means for admitting a cooling fluid thereinto, whereby the seams may be held in said press to cool the solder and at the same time to prevent spreading of said seams during the cooling operation.

4. A machine for soldering seams between sheets of metal, comprising a press including a jaw and a burner adjacent thereto for heating the same, whereby the seams may be held in the press to melt the solder, and a cold press spaced from the hot press for holding the seams to cool the solder and at the same time to prevent spreading of said seams during the cooling operation.

5. A seam press comprising a pair of spaced upright guides, a crown connecting the upper ends thereof, a fixed pressing jaw between the lower ends of said guides, a vertically movable pressing jaw guided by said guides, toggle links connecting the crown and the movable pressing jaw, and a cam shaft for actuating said links to depress said movable jaw.

6. A seam press comprising a pair of spaced upright guides, a crown connecting the upper ends thereof, a fixed pressing jaw between the lower ends of said guides, a vertically movable pressing jaw guided by said guides, toggle links connecting the crown and the movable pressing jaw, an additional pair of upright guides spaced from the other guides, a second crown connecting the upper end of said additional guides, a second fixed jaw between the lower ends of said additional guides, a second vertically movable jaw guided by said additional guides, additional toggle links connecting said second movable jaw and the second crown, and a single cam shaft disposed between the two pairs of guides and having cams for operating both sets of toggle links.

7. A seam press including a movable jaw, means for heating the same, operating means for said jaw, a bar to which said means is connected and to which the aforesaid movable jaw is secured, and ribs interposed between the jaw and bar to prevent the latter from excessively absorbing heat from the former, in combination with a second jaw with which said movable jaw coöperates.

8. A seam press including a fixed jaw, means for heating the same, a support for said jaw, and a plurality of ribs interposed between said support and the jaw to prevent the former from excessively absorbing heat from the latter in combination with a movable jaw coöperating with said fixed jaw.

9. A seam press including fixed and movable jaws and means for heating the same, a support for the fixed jaw, ribs interposed between the latter and said support, operating means for the movable jaw, a bar to which said means is connected and to which said jaw is secured, and additional ribs between the bar and the movable jaw substantially as and for the purpose specified.

10. The combination with a press for soldering seams between sheets of metal, said press including fixed and movable jaws and means for heating the same, of insulating means for preventing direct radiation of heat from the heating means to the sheets of metal being connected.

In testimony whereof I have hereunto set my hand in presence of two subscribing witnesses.

JAMES DONOGHUE.

Witnesses:
ANNA H. ELLIOTT,
R. C. DEAN.